(12) United States Patent
Warnaar et al.

(10) Patent No.: US 11,461,993 B2
(45) Date of Patent: Oct. 4, 2022

(54) SYSTEM AND METHOD FOR DETERMINING THE GEOGRAPHIC LOCATION IN AN IMAGE

(71) Applicant: Applied Research Associates, Inc., Albuquerque, NM (US)

(72) Inventors: Dirk B. Warnaar, Raleigh, NC (US); Lance E. Besaw, Avon Lake, OH (US)

(73) Assignee: Applied Research Associates, Inc., Albuquerque, NM (US)

( * ) Notice: Subject to any disclaimer, the term of this patent is extended or adjusted under 35 U.S.C. 154(b) by 0 days.

(21) Appl. No.: 17/141,684

(22) Filed: Jan. 5, 2021

(65) Prior Publication Data

US 2022/0215202 A1 Jul. 7, 2022

(51) Int. Cl.
*G06V 20/13* (2022.01)
*G06V 10/20* (2022.01)
*G06K 9/62* (2022.01)

(52) U.S. Cl.
CPC ......... *G06V 10/255* (2022.01); *G06K 9/6256* (2013.01); *G06V 20/13* (2022.01)

(58) Field of Classification Search
CPC ..... G06V 10/255; G06V 20/13; G06K 9/6256
See application file for complete search history.

(56) References Cited

U.S. PATENT DOCUMENTS

| | | | | |
|---|---|---|---|---|
| 8,538,943 B1 * | 9/2013 | Bau | ....................... | G06F 16/338 707/706 |
| 8,965,112 B1 | 2/2015 | Ibarz et al. | | |
| 10,186,036 B1 * | 1/2019 | Garcia | ....................... | G06T 7/13 |
| 10,783,353 B2 * | 9/2020 | Tan | ............................. | G06T 7/40 |
| 2006/0274949 A1 * | 12/2006 | Gallagher | ............ | G06V 40/172 382/228 |
| 2007/0150198 A1 * | 6/2007 | MacDonald | ............ | G01W 1/12 702/2 |
| 2011/0004405 A1 * | 1/2011 | Hutchin | .................. | G01S 5/163 250/353 |
| 2015/0030255 A1 * | 1/2015 | Wu | ....................... | G06K 9/6292 382/224 |
| 2017/0262476 A1 | 9/2017 | Malpani et al. | | |
| 2017/0301104 A1 | 10/2017 | Qian et al. | | |
| 2017/0344835 A1 * | 11/2017 | Singh | .................... | G06K 9/6293 |
| 2018/0262789 A1 | 9/2018 | Foulzitzis et al. | | |
| 2018/0264244 A1 * | 9/2018 | Meliga | ................. | A61B 17/205 |
| 2018/0359411 A1 * | 12/2018 | Kohstall | ................ | H04N 5/232 |
| 2018/0365324 A1 * | 12/2018 | Finberg | .................... | G06N 5/04 |

(Continued)

OTHER PUBLICATIONS

PCT Application No. PCT/US2021/062513 International Search Report and Written Opinion dated Mar. 17, 2022.

*Primary Examiner* — Sam Bhattacharya
(74) *Attorney, Agent, or Firm* — Erise IP, P.A.

(57) ABSTRACT

Methods and media for determining a list of geographic location candidates from an image of an environment are described. Open-source data indicative of the Earth's surface may be obtained and compared with images obtained from online sources. The images may be automatically analyzed using a plurality of modular convolution neural networks to determined probabilities of interest, environment, and if the image is locatable. Further, the resulting images may be analyzed for skyline and ridgeline depth orders and Region of Interest. A geolocation depicted in the image may be determined by comparing the results of the analysis with global geographic data.

20 Claims, 9 Drawing Sheets

(56) References Cited

U.S. PATENT DOCUMENTS

| | | | |
|---|---|---|---|
| 2019/0188859 A1* | 6/2019 | Muñoz Parraguez | G06F 17/16 |
| 2020/0012903 A1* | 1/2020 | Greene | G06K 9/6278 |
| 2020/0026928 A1* | 1/2020 | Rhodes | G06K 9/6267 |
| 2020/0027002 A1 | 1/2020 | Hickson et al. | |
| 2020/0065877 A1* | 2/2020 | Wang | G06Q 30/0629 |
| 2020/0134834 A1* | 4/2020 | Pao | G06N 3/0454 |
| 2020/0401853 A1* | 12/2020 | Xiong | G06V 20/52 |
| 2022/0012270 A1* | 1/2022 | Worster | G06F 17/18 |
| 2022/0036573 A1* | 2/2022 | Kim | G06N 3/08 |

* cited by examiner

SYSTEM AND METHOD FOR DETERMINING THE GEOGRAPHIC LOCATION IN AN IMAGE

RELATED APPLICATIONS

This non-provisional patent application shares certain subject matter in common with earlier-filed U.S. patent application Ser. No. 16/818,552, filed Mar. 13, 2020 and entitled LANDMARK CONFIGURATION MATCHER. The earlier-filed application is hereby incorporated by reference in its entirety into the present application.

BACKGROUND

1. Field

Embodiments of the invention generally relate to image analysis. Specifically, embodiments of the invention are directed to determining a location depicted in an image by analyzing the image.

2. Related Art

Traditionally, systems for determining geolocation from data such as images require manual annotations. People must sift through images determining the images of interest and significant markers in the images that may be used for determining the location. Many man-hours may be used to review thousands of images to identify images that depict the content that the user desires. When the user identifies the images that contain useful information, the user may then annotate information in the images that may help determine their location. The annotations may be identification of objects in the images such as, for example, buildings, mountains, sky, skyline, trees, roadways, water bodies, or any other information that may be useful in determining the geographic location in the images. This process of review and annotation may be manually intensive and time consuming.

Further, analysts may also review the images to determine if the image is of a Region of Interest (ROI). The analysts may review the images and determine if the images depict the ROI. If the images possibly depict the ROI, then the analyst may proceed with annotation. If the images do not depict the ROI, then the analysts may remove the images from further analysis.

Further still, when results are determined, analysts review the candidate lists and determines which candidates may closely match the locations. The analysts must compare the data from the image analysis with the geolocation data to determine how likely the data represents the geolocation.

The analyst review and annotation is time consuming and inefficient. What is needed is a system and method that can quickly and automatically identify a geolocation utilizing visual information exclusively. Specifically, when an image is received, the system may utilize a plurality of modular Convolution Neural Networks (CNNs) to reduce the number of images for analysis while automatically determining images of interest to the user, if the image depicts a natural outdoor location, and a probability of locatability of the image.

SUMMARY

Embodiments of the invention address the above-described need by providing for novel techniques for determining a location based on visual information. Specifically, systems and techniques for determining a list of geographic location candidates from an image of an environment are described. Images may be obtained from online sources and automatically analyzed using a plurality of modular convolution neural networks to determined probabilities of interest, environment, and if the image is locatable. Further, the resulting images may be analyzed for skyline, ridgeline depth orders, and region of interest. A geolocation depicted in the image may be determined by comparing the results of the analysis with global geographic data.

In particular, in a first embodiment, a method of determining a geographic location from an image, comprising the steps of obtaining a plurality of images, determining a first probability for each image of the plurality of images that each image of the plurality of images is of an outdoor environment, determining a second probability for each image of the plurality of images that each image is of interest, determining a third probability for each image of the plurality of images that each image depicts a location that can be automatically determined, combining the first probability, the second probability, and the third probability for each image to determine a set of images each with a combined probability above a threshold, determining a skyline in each image of the set of images and storing a first remaining set of images comprising images where the skyline is determined; determining a depth of the skyline in each image of the first remaining set of images and storing a second remaining set of images comprising images where the depth of the skyline is determined, determining an image region of interest for each image of the second remaining set of images and storing a third remaining set of images comprising images where the image region of interest is determined and determining a geolocation for each image of the third remaining set of images.

In a second embodiment, one or more non-transitory computer-readable media storing computer-executable instructions that, when executed by at least one processor, perform the steps of determining a geographic location from an image, comprising the steps of obtaining a plurality of images from the Internet, determining a first probability for each image of the plurality of images that each image of the plurality of images is of an outdoor environment, determining a second probability for each image of the plurality of images that each image contains content that is of interest to the user, determining a third probability for each image of the plurality of images that each image depicts a location that can be automatically determined, combining the first probability, the second probability, and the third probability for each image to determine a set of images each with a combined probability above a threshold, determining a probability map in each image of the set of images, wherein the probability map presents a probable mountain area, a probable sky area, and a probable others area, determining a rough skyline between the probable mountain area and the probable sky area, determining a fine skyline in each image of the set of images and storing a first remaining set of images comprising images where the fine skyline is determined, determining a depth of the skyline in each image of the first remaining set of images and storing a second remaining set of images comprising images where the depth of the skyline is determined, determining an image region of interest for each image of the second remaining set of images and storing a third remaining set of images comprising images where the image region of interest is determined, and determining a geolocation for each image of the third remaining set of images.

In a third embodiment, a method of determining a geographic location from an image, the method comprising the steps of obtaining a plurality of images from an online source, determining a first probability for each image of the plurality of images that each image of the plurality of images is of an outdoor environment, determining a second probability for each image of the plurality of images that each image contains content that is of interest to the user, determining a third probability for each image of the plurality of images that each image depicts a location that can be automatically determined, combining the first probability, the second probability, and the third probability for each image to determine a set of images each with a combined probability above a threshold, determining a skyline in each image of the set of images and storing a first remaining set of images comprising images where the skyline is determined, determining a depth of the skyline in each image of the first remaining set of images and storing a second remaining set of images comprising images where the depth of the skyline is determined, determining a region of interest for each image of the second remaining set of images and storing a third remaining set of images comprising images where the region of interest is determined; and determining a geolocation for each image of the third remaining set of images.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTIONS OF THE DRAWING FEATURES

Embodiments of the invention are described in detail below with reference to the attached drawing figures, wherein.

The drawings do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide systems and methods of automatically determining a geographic location depicted in an image. Specifically, in some embodiments, the independent modular CNNs analyze images (for example, images scraped from online websites) to separately determine a probability of a depicted naturally outdoor environment, a probability of interest to the user, and a probability of if the image is locatable. The images with the highest probabilities may be analyzed for skyline, ridgeline, and landmarks to determine geolocation candidates. In some embodiments, the candidates may be ranked. When a candidate is determined to be correct, parameters of the CNNs may be updated such that continuous improvement is made to the system.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized, and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments but is not necessarily included. Thus, the technology can include a variety of combinations and/or integrations of the embodiments described herein.

Figure 1:
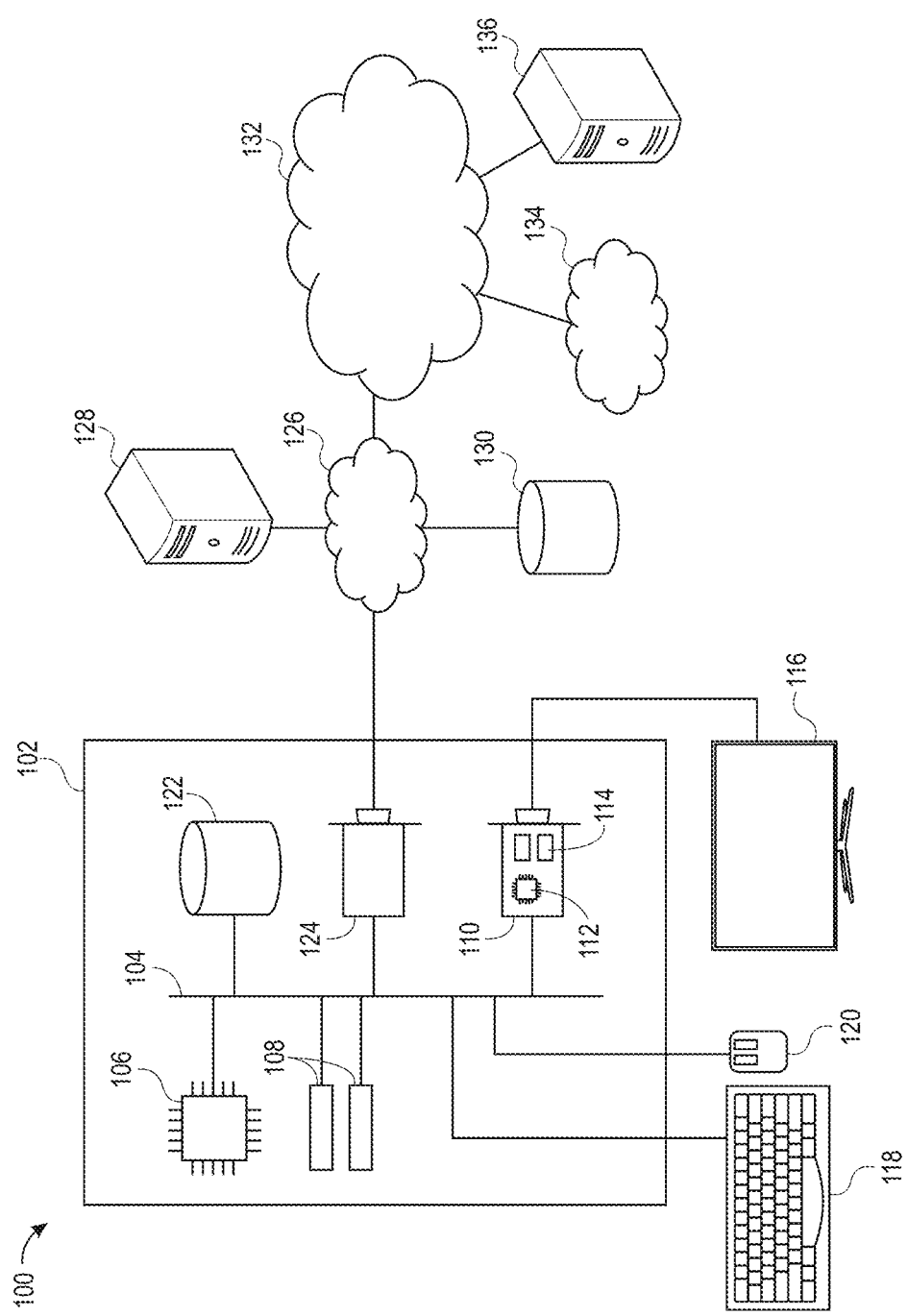
FIG. 1 depicts an exemplary hardware platform for certain embodiments of the invention.

Turning first to FIG. 1, an exemplary hardware platform 100 for certain embodiments of the invention is depicted. Computer 102 can be a desktop computer, a laptop computer, a server computer, a mobile device such as a smartphone or tablet, or any other form factor of general- or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules 108. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also, on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media and may be internally installed in computer 102 or externally and removably attached.

Computer-readable media include both volatile and nonvolatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-useable instructions, data structures, program modules, and other data representations.

Finally, in some embodiments, network interface card (NIC) 124 is also optionally attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object-oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

In some embodiments, the geolocation system comprises a modular and flexible image analysis process. The geolocation system may receive or otherwise extract images. The images may be input by a user for analysis or the images may be obtained by a system scraping process scraping images from an online source. The images may be obtained from particular websites that promote material of interest. For example, the user may be a government organization and the images may be obtained from a known terrorist organization website. Further, the images may be the result of a query in an online query engine and the images may be downloaded and analyzed to determine the location depicted in the images as described in embodiments below.

Figure 2:
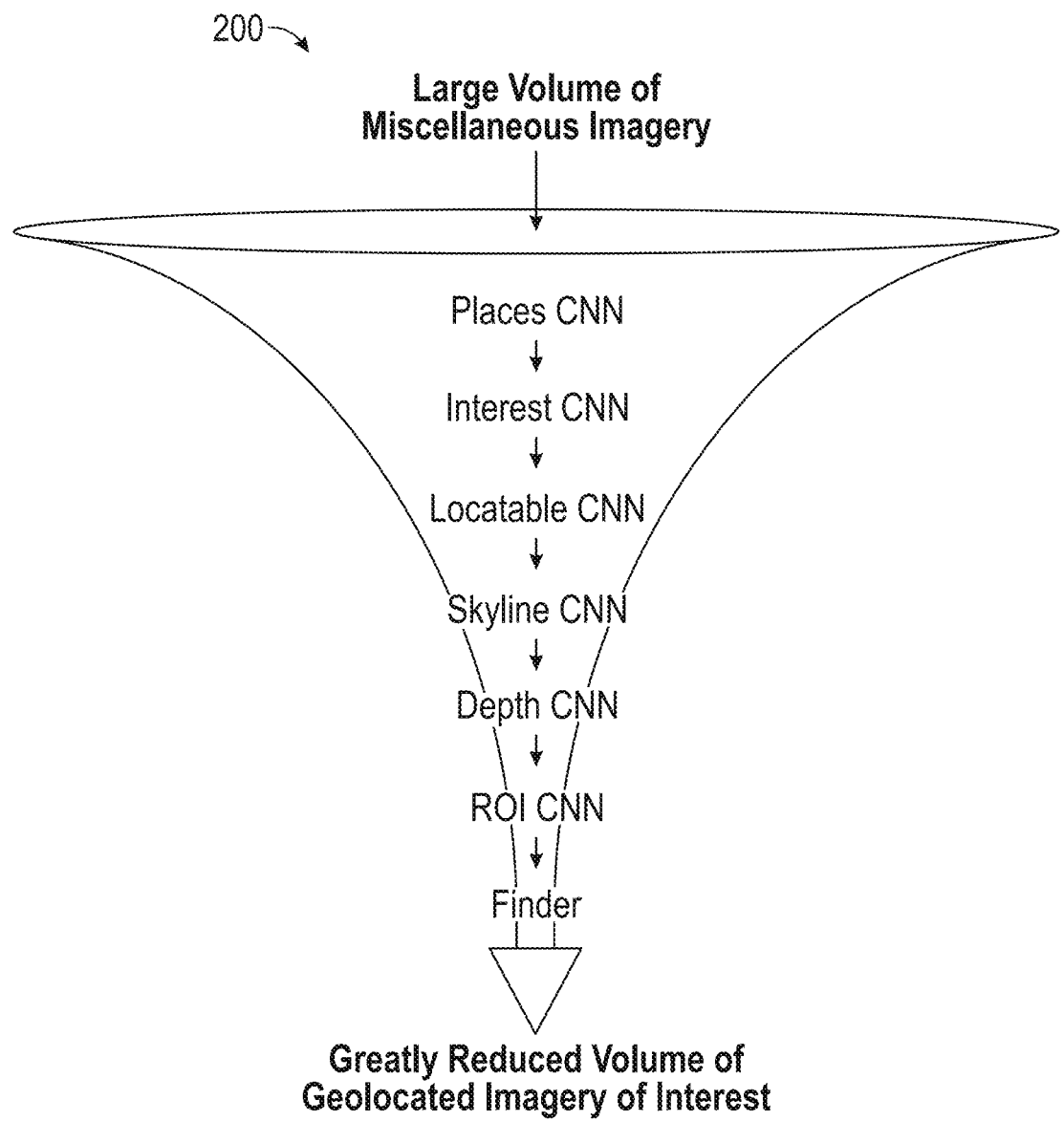
FIG. 2 depicts an exemplary process of reducing a number of images.

FIG. 2 depicts an exemplary process of reducing a number of images that may be obtained by the system referenced generally by the numeral 200. In some embodiments, various steps may be performed for determining if the image is a natural outdoor setting, if the image is of interest (or what the user is looking for), and if the scene in the image is locatable. Further, the skyline may be analyzed for relative height and depth, an ROI may be determined from classifications of items in the image, and the images with the highest correct location probability may be determined. At each step the number of acceptable images may be reduced such that each subsequent step is analyzing fewer images than the previous step. Further, some of the modular steps may be performed in any order such that the steps reducing the images the most may be performed first thus initially greatly reducing the number of images. A set of images from the places CNN, locatable CNN, and interest CNN may be analyzed to determine skylines and ridgelines in the images as well as landmarks that may provide information to compare to known stored global information. The information determined from the images may be compared to the known global information to determine a geographic location in the images. A list of candidate images may be created that have the highest probability of producing an accurate geographic location match.

In some embodiments, open-source data of the Earth's surface may be combined to produce a Geographic Knowledge Base (GKB) for comparison with the image data. The GKB may comprise elevation, landmarks, landcover, water bodies, water lines, and any other data that may be useful. Further, in some embodiments, the Earth's surface may be broken up into grids to narrow the field of search to smaller and smaller areas to reduce the data analysis. The GKB is described in greater detail in earlier-filed U.S. patent application Ser. No. 16/818,552 filed Mar. 13, 2020 and entitled LANDMARK CONFIGURATION MATCHER incorporated by reference in its entirety into the present application.

Figure 3:
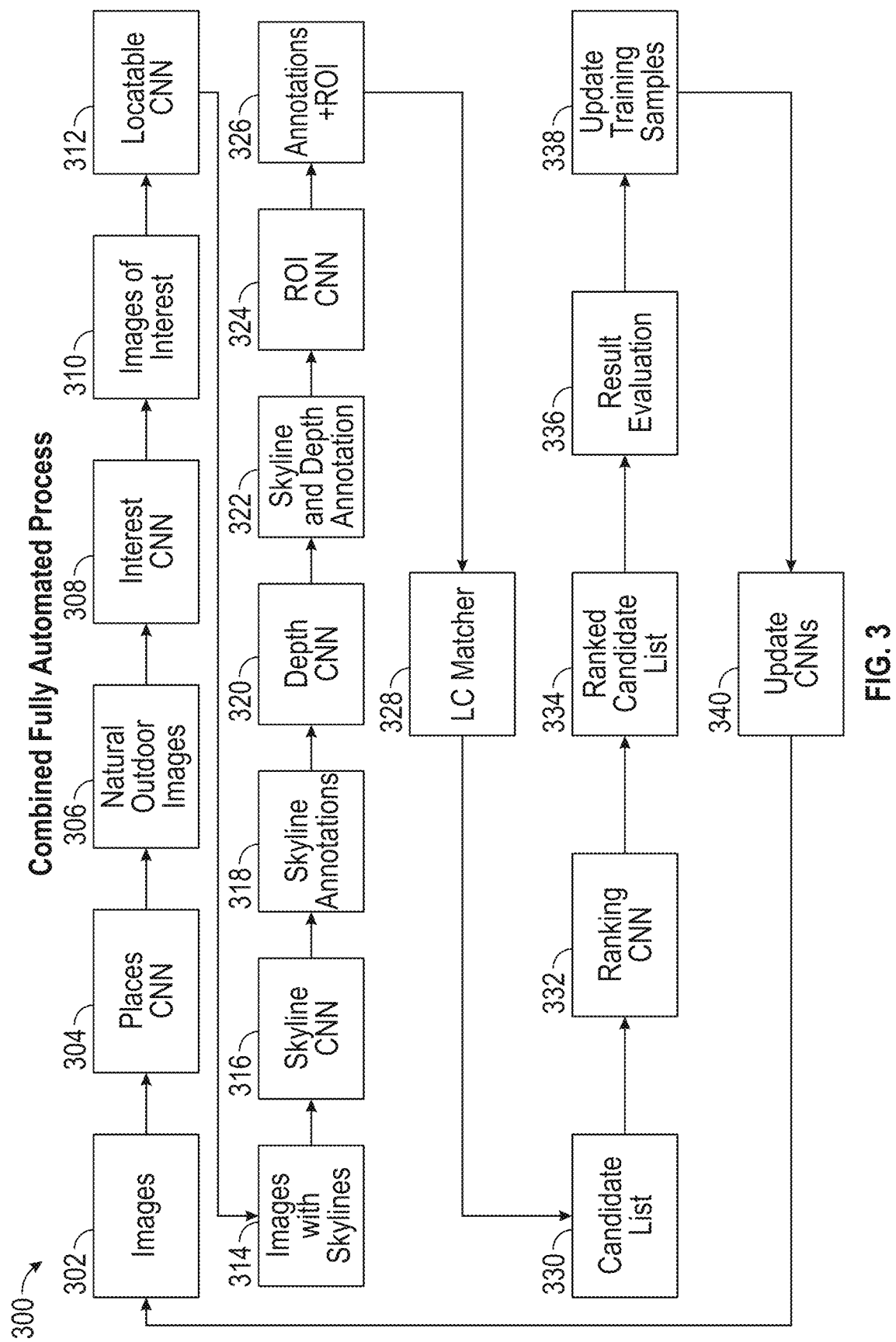
FIG. 3 depicts exemplary flow chart illustrating a method of analyzing images to determine geolocation depicted in the images.
Figure 4:
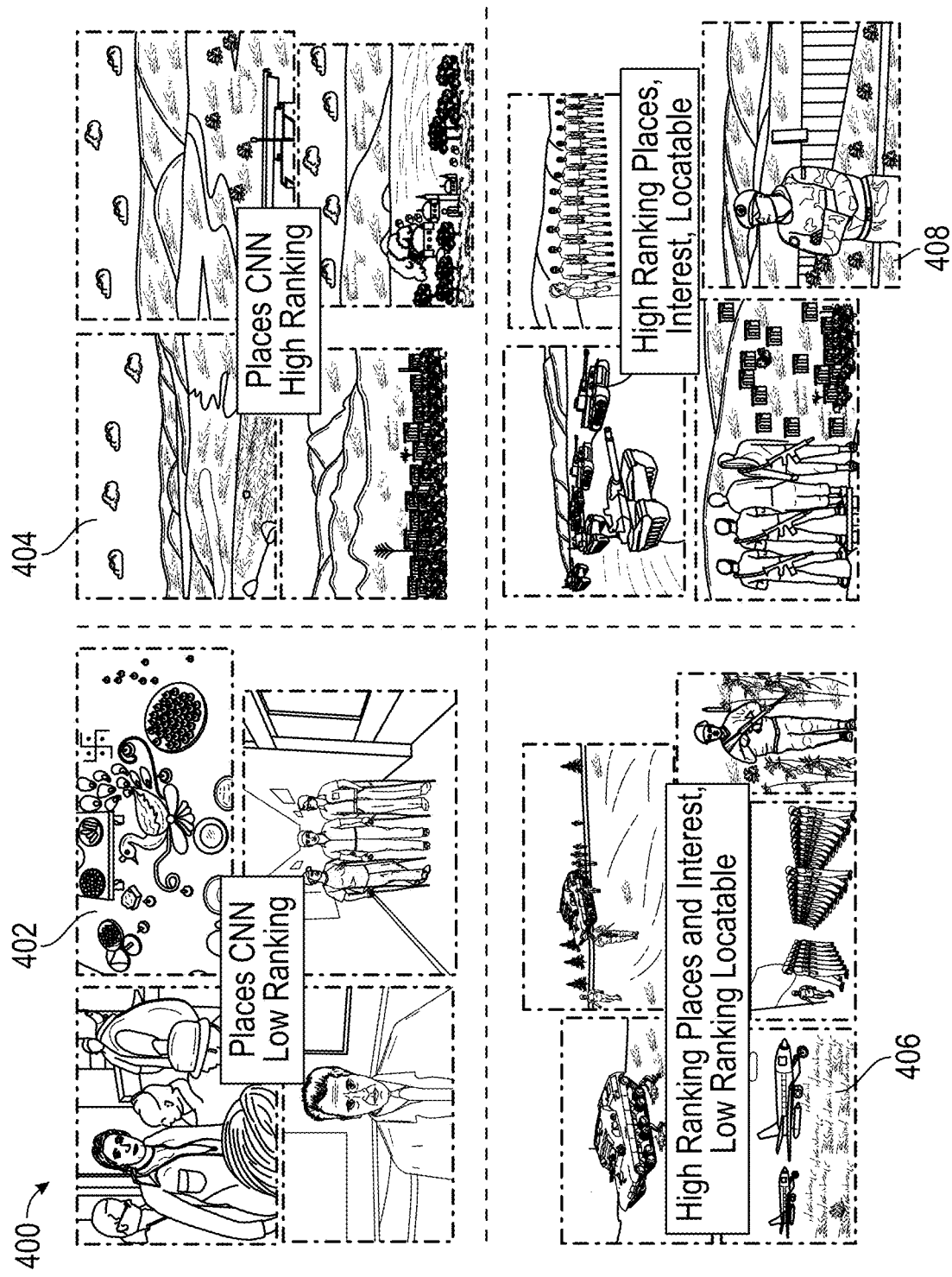
FIG. 4 depicts exemplary images.

FIG. 3 depicts an exemplary automated process for reducing the images to natural and outdoor, locatable, interesting, and determining probable skylines and ridgelines and determining geolocations depicted in the images generally referenced by numeral 300. At step 302, the geolocation system obtains images. The images may be received from a user or may be obtained from an online source. In some embodiments, the images may be obtained from the internet through an automated search related to a desired output of the user. For example, the user may be a government organization and the desired outcome may be to find the location of terrorist organizations from images displayed on the Internet. The geolocation system may automatically navigate to known websites or may perform automatic online keyword searches and scrape the webpages for images. The images may be downloaded into the system for subsequent analysis. Exemplary images are depicted in FIG. 4.

In some embodiments, any images comprising known information may be used to train the CNNs described herein. For example, the exemplary scenario of searching for terrorist locations described above may be one of many possible searches. In some embodiments, any images with known information may be used to train the CNNs. For example, images depicting regions around the world of various sporting events may be used to determine the popularity of various sports in different nations. In another example, images of cats and dogs may be analyzed to determine the popularity of cats vs. dogs across the United States. Further, the CNNs may be trained to recognize cat and dog breeds and the popularity of cat and dog breeds may be mapped across the world or across predefined regions. Any known images may be used to train the CNNs described to determine locations of images that may be sourced from the Internet or from user input. A more detailed description of the training and analysis processes is described below.

At step 304, the images may be analyzed to determine a probability of the environment depicted in the images. The images may be analyzed using a places CNN that is trained on indoor and outdoor images. Further, the places CNN may be trained to determine man-made and natural objects. A plurality of categories may be used to determine a probability that the images were taken in a natural outdoor environment. For example, the plurality of categories may be at least open area, natural light, vegetation, hiking, camping, faraway horizon, sunny, foliage, man-made, dry, dirt, rugged, warm, cold, snow, rain, sky, mountains, hills, and any other category that may be used to determine natural, man-made, outdoor, and indoor environment. Exemplary images representing low ranking places images are depicted in FIG. 4 quadrant 402 and high-ranking places images are depicted in quadrant 404.

In some embodiments, the images may be matched to the categories to determine a probability of a natural outdoor environment. For example, if a table, chairs, pictures, walls, lights, and other indoor objects are determined to be depicted with a high probability, a high probability of an indoor environment may be determined. If sky, mountains, river, and other natural outdoor classifications are determined to be depicted in the images, then a high probability of a natural outdoor environment may be determined. The probability may be determined by combining the probability of classifications of each individual object in the image. For example, a known image may be used to train the places CNN. The parameters of the CNN may be optimized to provide results of images that depict natural outdoor environments. The places CNN may analyze the image and it may be determined that there is a likelihood of 80% of an indoor light in the image. If the known images contains the indoor light, the training sequence confirms the correct response and feeds back the correct response. The parameters of the places CNN may be updated to improve the system by recognizing the correct response. The CNN learning functions are described in more detail below.

In some embodiments, a weighted combination of classifications may be used to determine the probability that the image depicts a natural outdoor environment. In some embodiments, the probabilities for each object classification determined in the image may be combined to determine a probability that the image is of a natural outdoor environment. For example, the likelihoods may be multiplied, summed, averaged, or combined in any manner to determine a final probability that the images is of an outdoor environment.

Exemplary images analyzed by using the places CNN are depicted in FIG. 4. The upper left quadrant 402 depicts images that are found to have a low probability of depicting a natural outdoor environment. The upper right quadrant 404 depicts images that are found to have a high probability of depicting a natural outdoor environment.

At step 306, in some embodiments, the images with the highest probability of depicting a natural outdoor scene are selected and stored for further analysis. The images with the highest probability, a probability above a specified threshold, or rank above a specified threshold may be stored for further analysis. The determined natural outdoor probability for each image may be associated with the image such that the natural outdoor probability may be combined with other probabilities after further analysis.

In some embodiments, the places CNN may be trained to recognize indoor environments, urban environments, environments with a visible coastline, or any other environment that may be of interest to the user. The places CNN may be trained using known images of the type of environment that is interesting to the user.

At step 308, in some embodiments, an interest CNN is trained to determine images of interest. The interest CNN may be trained to determine objects in the images that are of interest to the user. The interest CNN may be trained to recognize objects in the images as described above. The interest CNN may be trained to detect man-made and natural objects, text, symbols, faces, and any other items in the images that may be useful in determining a probability of interest based on known training images. For example, the user may be a government organization and may want to determine the location of terrorist training facilities in the Middle East. The interest CNN may be trained on Arabic text, known terrorist organization symbols, known terrorist facial features, types of weapons, types of clothing, types of military or militia clothing, types of vehicles, types of military and law enforcement vehicles, and any other items in the images that may create an interest probability based on the training images. The lower left quadrant 404 and the lower right quadrant 406 of FIG. 4 depict high ranking interest images based on the terrorist and military imagery.

In other exemplary embodiments, the interest CNN may be trained to detect people or objects through facial and object recognition. For example, the interest CNN may be used to detect persons-of-interest, fugitives, hostages, or particular objects. The training may be performed quickly and the interest CNN may be implemented by government agencies such as the Department of Homeland Security and the Federal Bureau of Investigation.

At step 310, in some embodiments, the interest CNN may output each image with the interest probability associated with each image. The images with the highest probability, or a probability of interest above a specified threshold, may be stored for further analysis. The interest probability may be based on the number of interesting items, or classification of items, and the probability of interest of the items or item classifications. In some embodiments, the interest probability may be combined with other probabilities after further analysis such that the total number of images to be analyzed may be reduced.

At step 312, in some embodiments, a locatable CNN may be trained to determine images that have a high probability of determining the location depicted in the images. The locatable CNN may be trained on images of known locations such that parameters of the locatable CNN are tuned to the highest rate of determining the locations depicted in the images. The locatable CNN may be trained to recognize visible and unique skylines and ridgelines. As with all CNNs, when the images are processed the parameters that led to the highest percentage of recognizable locations may be stored. Further, each time the images are correctly located, the parameters may be adjusted to improve the locatable CNN.

As depicted in FIG. 4, the lower left quadrant 406 depicts images with high ranking places and interest. However, these images also do not depict distinct skylines and therefore, have a low probability of being locatable. Alternatively, the lower right quadrant 408 depicts images with high rankings in places, interest, and locatable as the images depict distinct skylines along with a natural outdoor environment and recognizable interest (e.g., military, militia, terrorist, etc.) imagery.

At step 314, in some embodiments, the output of the locatable CNN is images with high probability of depicting skylines. The probable skylines in the images may be refined and used to determine the geolocation depicted in the images in subsequent analysis described in embodiments below.

In some embodiments, the images with the highest probability are analyzed for skylines. FIG. 4 depicts the four quadrants described above. In some embodiments, the images that rank with high probabilities for locatable, natural outdoor environment, and interest are analyzed to determine a detailed skyline in the images. In some embodiments, the probability an image is locatable, the probability for a natural outdoor environment, and the probability the image is of interest is combined by combining (for example, summing or multiplying) the probabilities for each image of the plurality of images. If the sum is above a minimum threshold then the image is saved. The saved set of images may then be analyzed to determine skylines. The detailed skylines in the set of images may be used to determine the locations depicted in the images. In some embodiments, the images that do not meet the minimum threshold are discarded. Any image that does not meet a minimum threshold after each CNN analysis may be discarded. By doing do, this process reduces the number of images that are analyzed at each step.

Figure 5A:
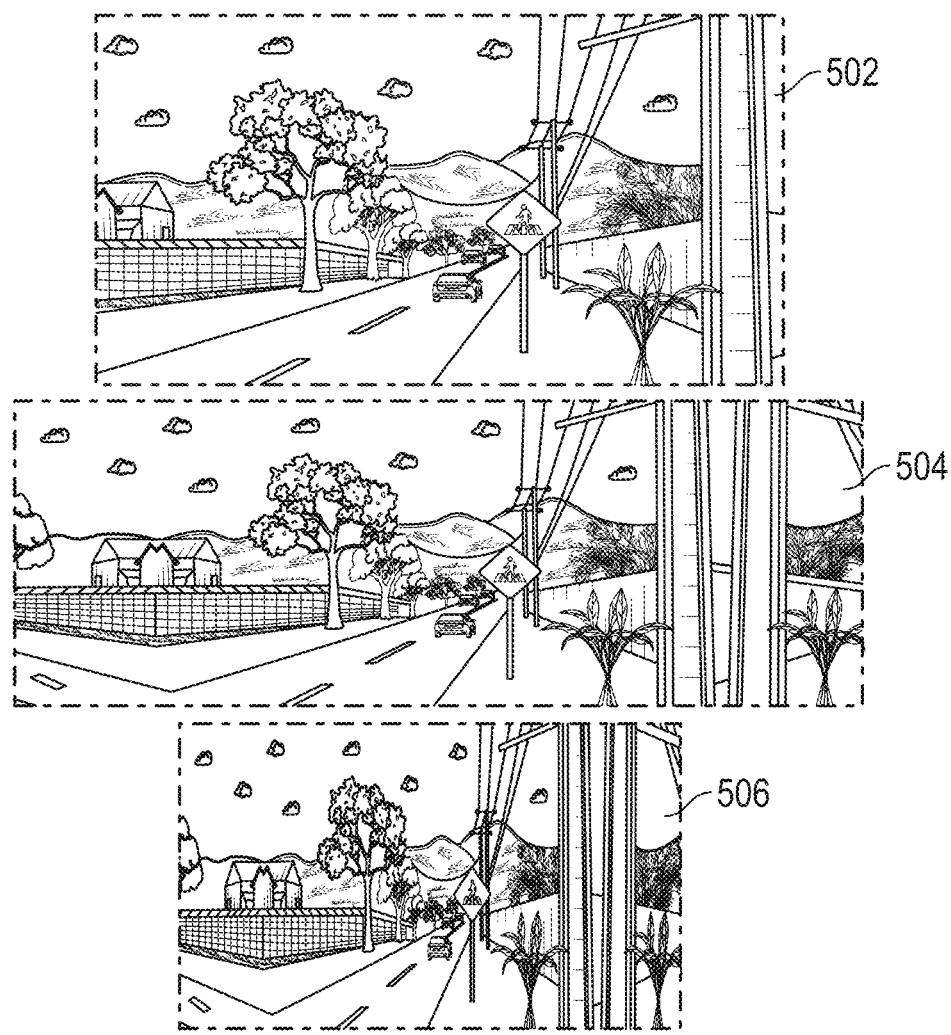
FIG. 5A depicts a resized image.
Figure 5B:
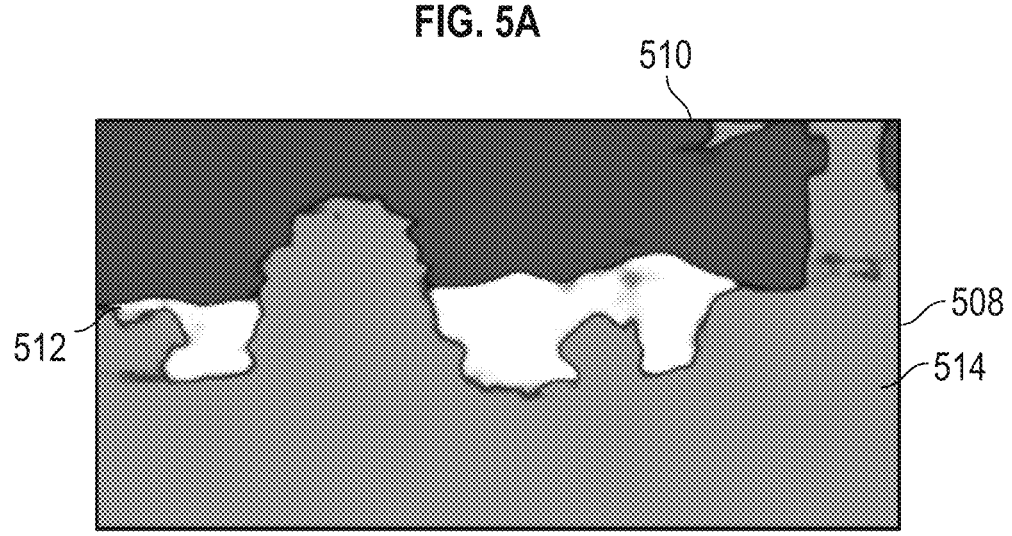
FIG. 5B depicts an exemplary probability map of an image.
Figure 5C:
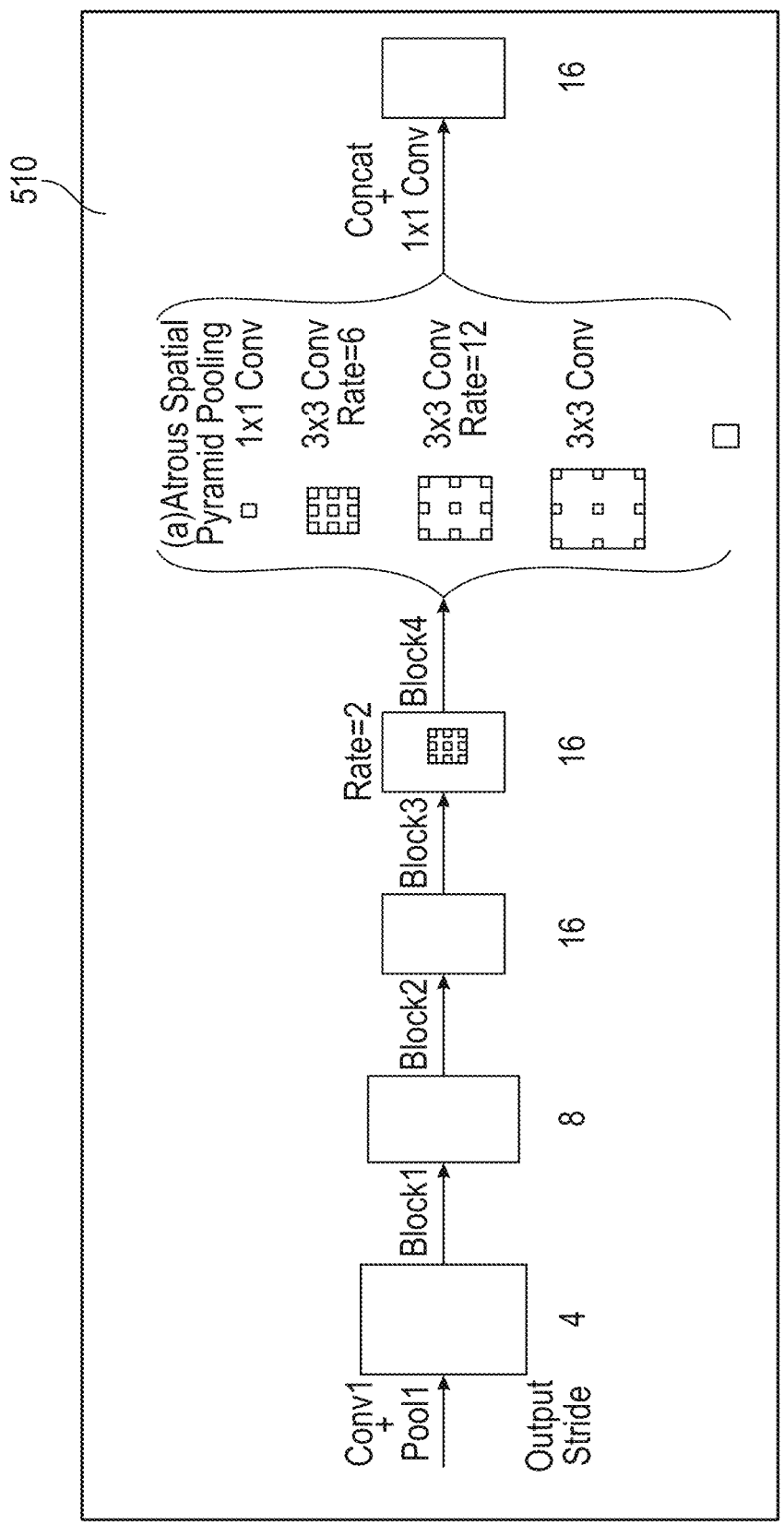
FIG. 5C depicts an exemplary segmentation and probability skyline detection.

At step 316, in some embodiments, a skyline CNN is used to automatically detect and extract the skyline for analysis. First, a rough skyline may be determined as depicted in FIGS. 5A-5C. For example, an image 502 of the set of images may be analyzed. The edges of the image 502 may be reflected 504 and added to sides of the image 502 such that the full image including the reflected edges may be analyzed without running into problems with the edge of the image 502. This ensures that the total area of the image 502 is analyzed. Further, the image 502 may be resized 506 to reduce the amount of data to be analyzed. This may quicken the processing and allow more images to be analyzed in a shorter time frame.

Turning to FIG. 5B, in some embodiments, an image segmentation CNN is used to determine at least three classifications depicted in the image 502. For example, the image 502 may be segmented into mountains, sky, and other. A probability map 508 may be determined for the image 502. The probability map 508 depicts each segmented portion of the image 502 with a probability that an upper segmented portion 510 is sky, a probability that the middle-segmented portion 512 is mountains, and a probability that the lower segmented portion 514 is other (not mountain and not sky).

In some embodiments, atrous convolution is used to segment the images. The atrous convolution can be seen in FIG. 5C. In some embodiments, the atrous convolution is performed with rate equal to two to increase the outputs. The accuracy is then improved with the Atrous Spatial Pyramid Pool (ASPP). The output of the ASPP is then smoothed with a Conditional Random Field (CRF) algorithm. When the images are segmented, a rough skyline in the image may be determined. The original image 502 as well as the previously determined probability map 508 for segmentation described above may be input into the CRF. In some embodiments, the output of the CRF is a refined probability map for the mountains, sky, and other classifications representing a rough skyline.

In some images, the skyline may be obstructed by the "others" (i.e., not mountains or sky). The pixels in the image classified as "others" may be removed, When the "other" pixels are removed the probable skyline is the boundary between sky and mountain pixels. The probable skyline is stored for further analysis.

In some embodiments, a rough Viterbi tracker is implemented on the probable skyline to provide an estimated skyline between the mountains and the sky. In some embodiments, the input to the Viterbi tracker is the skyline probability. The Viterbi tracker iterates through the disconnected segments of the probable skyline taking the most probable path. As the Viterbi tracker moves along the probable skyline x and y coordinates for the estimated skyline are output. The resulting skyline may have a minimum probability threshold and may have a minimum segment length based on the image size. The result is an estimated rough skyline 606 as depicted in FIG. 6A.

Figure 6A:
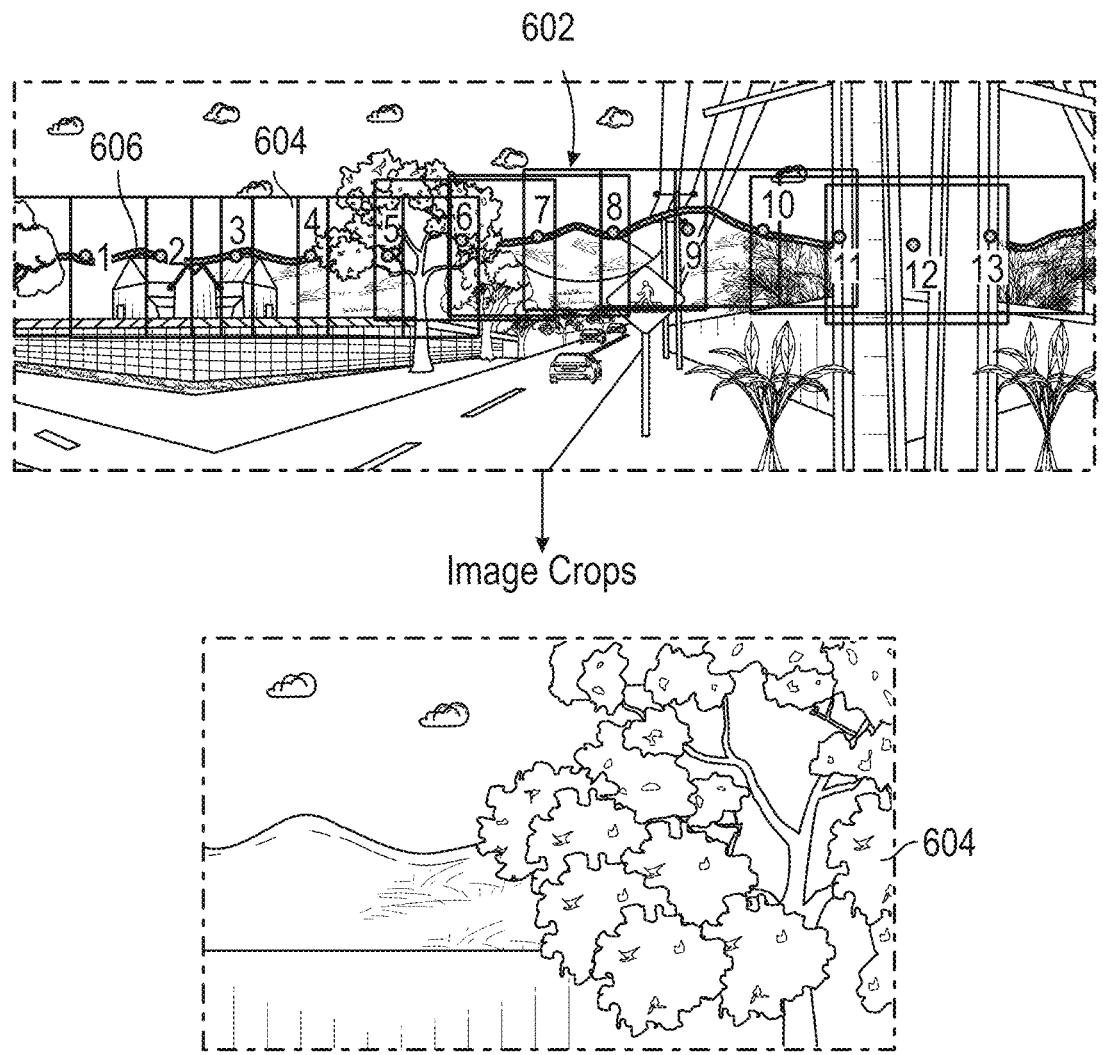
FIG. 6A depicts exemplary cropping of the image.
Figure 6B:
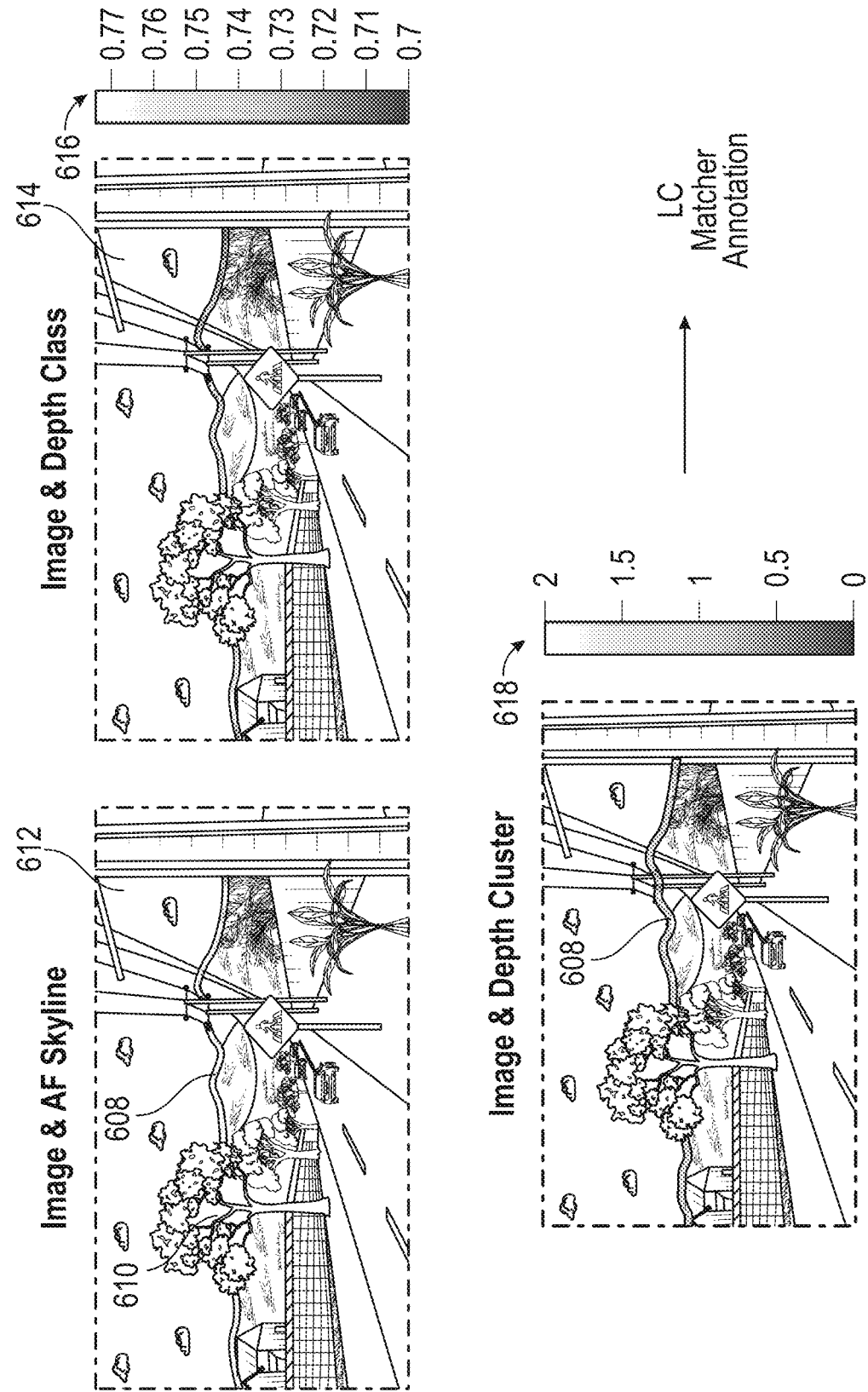
FIG. 6B depicts exemplary skyline post-processing in the image.

In some embodiments, the rough skyline 606 generated by the above-described techniques is refined as shown in FIGS. 6A-C in an iterative process. Because the estimated rough skylines have been determined in the images by the above-described methods, performing the techniques described above in FIGS. 5A-C in an iterative process beginning with the rough skyline 606 results in a fine skyline 608. The process of determining a fine skyline 608 may begin by cropping the images as shown in FIG. 6A. Small sections, or cropped sections 602, of the image 502 may be analyzed independently. A single cropped section 604 is depicted. Each cropped section (1, 2, 3, etc.) may be analyzed using the segmentation CNN to produce new probabilities of mountain, sky, and other segments of the image as described above. The new segments, or probability maps, may be run through the atrous CNN as described above. New probability maps may be generated based on the results of the CRF generating a new probable skyline. Next, the Viterbi tracker may be processed again through the new probable skyline creating x and y coordinates of the fine skyline 608. The fine skyline 608 may then move to a post-processing procedure.

Turning back to FIG. 3, at step 318, a skyline post-processing procedure and annotation is performed. In some embodiments, each pixel may be analyzed along the skyline. A patch above and a patch below the pixel may be compared to determine a difference between the patches. If the patches are significantly different, the skyline may be retained at that point. If the patches are similar, then the skyline at that point may be removed. In some embodiments, a Kruskal-Wallace test may be performed to test the difference. For example, a probability that the patches are sampled from the same distribution may be determined. A threshold test, such as the log of the probability being greater than or equal to a number, may be applied to determine if the patches are the same or different. The results of the Kruskal-Wallace test can be seen in FIG. 6B. If the patches are different then the fine skyline 608 is retained. If the patches are the same or similar, then the fine skyline 608 may be removed as shown at 610 in images 612 and 614. When the final skyline is determined, the skyline is stored for further analysis.

In some embodiments, the depth of the fine skyline 608 is determined. FIG. 6B depicts the fine skyline 608 with depth classification 616, and the fine skyline 608 with depth clusters 618. The depth classification 616 may be determined by relative depth of the fine skyline 608 and the depth cluster 618 may be determined by averaging the relative depths to determine which depths are likely to be from the same ridge. A more detailed explanation is provided below in relation to ridgeline depth analysis.

In some embodiments, the results of the skyline CNN are compared to known skyline images to further tune the parameters of the skyline CNN. When the results of the skyline CNN align with true skyline information in the known images, the parameters can be kept or otherwise combined with the previously stored parameters of the CNN to increase the confidence in predicting the skylines.

In some embodiments, a true test positive rate may be used to determine the probability that a skyline will test true and a positive predictive value may be applied such that the confidence in the skyline CNN may be known. If the confidence in the skyline CNN increases based on parameter changes, then the new parameters may be stored. If the confidence does not change or is decreased, then the new parameters may not be stored. This process for increasing the confidence in the skyline CNN may be applied to any CNNs or algorithms described herein.

Figure 7:
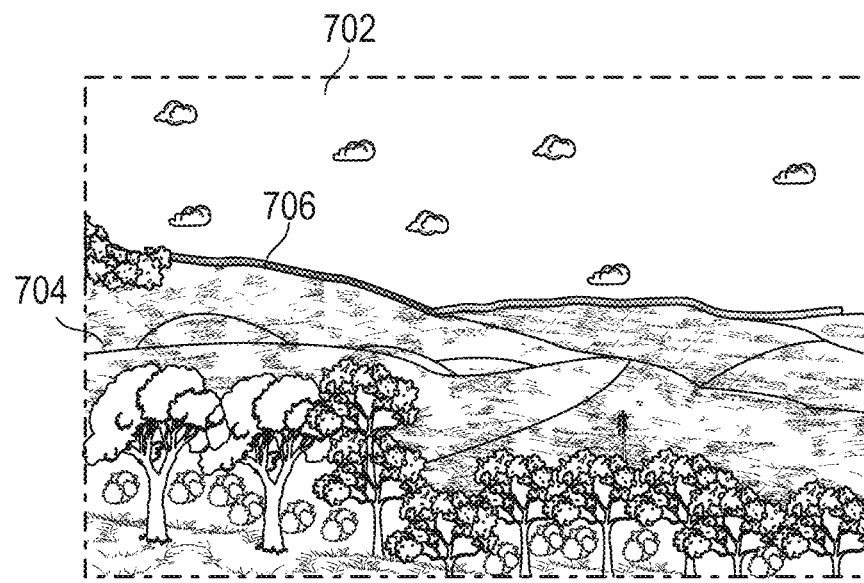
FIG. 7 depicts exemplary ridgeline depth analysis in the image.
Figure 7:
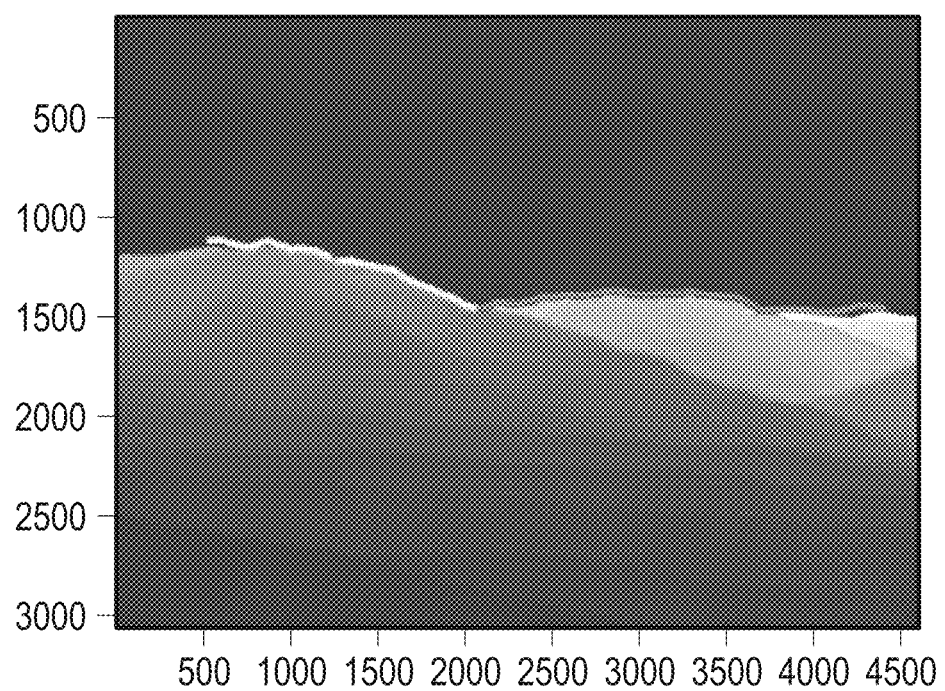

At step 320 in FIG. 3, in some embodiments, a depth analysis of the image 502 may be performed with a depth CNN. The depth CNN may be trained on known images of mountain ranges to determine the relative depth of the skyline and ridges of the mountains in front of the skyline. The known images of mountain ranges have known ridges and relative depth, or distance between the ridges, such that the depth CNN can be trained to provide depth analysis to a specified minimum probability threshold. As the depth CNN provides more depth analysis, the training data is increased, and the depth CNN can be improved as described in embodiments above. Sample results of the depth analysis are shown in FIG. 7.

In some embodiments, the original images and the skylines determined above may be input into the depth CNN. As described above, the images may be cropped to analyze small sections at a time. In some embodiments, the depth predictions may be normalized by providing relative distances between the ridges. In some embodiments, the predicted depth values may be provided as a distance from the source of the image.

In some embodiments, the depth analysis comprises a process of determining a ridge order. When the depth estimates from the depth CNN are determined, an order of the ridges may be determined. The ridge order may be determined by a process starting with finding the peaks of the depth distribution. The peaks of similar depth may be kept together while the peaks that are separated in depth may be kept separate. Further, groups of peaks that may have overlap may be consolidated into one group. The mean depth for each group of peaks may be determined. Small groups may be consolidated, or clustered, and the means and standard deviation of groups may be compared based on z-score. Finally, the groups of ridges may be ordered by mean depth such that ridges that are close to the same mean depth are grouped, or clustered, together. In some embodiments, the same process may be applied to the skyline as described above. FIG. 7 depicts a hillside image 702 displaying ridgelines 704 and a skyline 706. The subsequent image depicting results of the depth CNN analysis described above depicts shading of different levels of the ridges, or clusters of ridges, and the skyline 706.

At step 322 of FIG. 3, the output and annotation of the depth CNN and subsequent analysis may be the ordered mean depth values associated with the corresponding ridgelines 704 in the images. The ridgelines 704 may be presented as normalized depth values based on relative depths of the ridgelines 704. In some embodiments, the estimated distance from the source of the image can be determined and stored.

At step 324, in some embodiments, a Region of Interest (ROI) is determined based on items in the image using a ROI CNN. In some embodiments, the ROI CNN may comprise hierarchical models and scene classification that may be used to determine the ROI. In some embodiments, geographical cells with a balanced number of images may be used, and each cell may be a classification. A geolocation estimation may be based at least in part on the depicted scene in the image comprising scene classifications and the geographical cell input that comprises geographic regions. The output may be a probability of various geographic locations. The various geographic locations may be ranked based on the probability and the regions may be analyzed in the order of the highest ranked to lowest.

In some embodiments, the system may use open-source software such as S2 Geometry library utilizing 6 face cubes or a spherical surface to model the surface of the Earth. Further, the scene classification may utilize ResNet152 to classify scenes as indoor, outdoor natural, and outdoor man-made. The system may automatically connect to the open-source software via a custom Application Program Interface (API) that allows for fully automatic transfer of data between the system and the open-source software as described above.

At step 326, the output of the ROI analysis may associate probable ROIs with the images. The ROIs and the images may be analyzed by the Landmark Configuration (LC) matcher. The LC matcher may compare the data determined from the images with data in each ROI. In some embodiments, the ROIs are ranked with a high probability to a low probability and the ROIs are analyzed in order of high rank to low rank.

At step 328, in some embodiments, the LC matcher is used to determine the geolocation depicted in the images. The data from the images such as, for example, the skyline elevation data, ridgeline data, skyline annotations, and any objects recognized in the images may be compared to geolocation data stored in a database for each ROI and image.

In some embodiments, a process for determining a list of geolocation candidates may comprise combining global open-source data indicative of features of the Earth's surface and object on the Earth's surface and comparing with data obtained by a user. The set of images may be compared to the global data to determine a list of candidate geographic locations of the environment depicted in the image. The global data may be geographic data that, in some embodiments, may be open-source data. The geographic data may be obtained via satellites, aerial vehicles, and ground/water collection methods. The global data may include images, video, annotation, any user added text, location information, relative distance information between objects, topography, landmarks, or any other information that may be useful as described in embodiments herein. Opensource data may be collected from Digital Elevation Models based on monoscopic or stereo pair imaging, radar, and elevation measurements. In some embodiments, the Digital Elevation Models are collected from Advanced Spaceborne Thermal Emission and Reflection Radiometer (ASTER), Shuttle Radar Topography (SRTM), TerraSAR-X add-ons for digital elevation measurements (TanDEM-X), and any other DEM.

Further, in some embodiments, open-source land cover data may be obtained for comparison with the images. The land cover data may be obtained from GeoCover Landsat 7 data, LandScan global population distribution data for urban and rural environments, and Dynamic Land Cover Dataset (AU DLCD) for vegetation indexes.

In some embodiments, crowd-sourced datasets of streets, rivers, landmarks, and any other information supplied by people may be used. In one example, this information may be obtained from Open Street Map (OSM). Further, in some embodiments, country lines (and/or other geopolitical boundaries) may be obtained from outlines (such as ArcGIS data), shoreline data may be obtained from the National Oceanic and Atmospheric Organization (NOAA), and cell tower information may be used from Open Cell ID. The data may be combined to create information indicative of any region in the world and may generally be referred to as region-specific data or global data.

The global data covers most of the world and, therefore, provides expansive coverage of the Earth for visual-based location determination. The global data may be combined to create data that is indicative of elevation, landmarks, and natural and man-made structures at worldwide locations. In some embodiments, the global data from each of the sources may be combined and into a large data set and masks created for categorization and efficient access and comparison. Further, the data may be broken up into various regional locations based on grid creation over the Earth's surface.

In some embodiments, the global data may be processed to create a Geolocation Knowledge Base (GKB). The global data (comprising, for example, streets, rivers, landmarks, elevations, and other environmental object data) may be separated into one-degree latitude by one-degree longitude cells across the surface of the Earth. In some embodiments, masks may be created for different objects contained within each cell. For example, masks may be created for ocean, land, vegetation, desert, forest, urban, rural, mountains, hills, valleys, ridgelines, houses, buildings, or any other feature in the environment that may be categorized to create efficient search queries and stored in the GKB.

The set of images that are processed in blocks 302-328 and output from the skyline CNN may be compared to the data from the GKB to determine the geolocation in the images. At step 330, a list of geolocation candidates is analyzed and output from the LC matcher. In some embodiments, when the lowest error geolocations are found, a process of uncertainty polygon and result clustering is performed to determine the result confidence. Further, ranking the candidates based on the error calculations and pruning to only candidates with error below, or rank above, predetermined thresholds may be performed.

At steps 332-334, the final list of geographic location candidates may be ranked using a rank CNN. The rank CNN may be trained on known images that coincide with the images that the user desires and contains known geolocations. The rank CNN may determine and provide a rank for each image of the set of images processed by the LC matcher. The images that are determined to have the highest probability of accurate geolocation matches are ranked highest. Therefore, a minimum threshold of image rank may be provided to reduce the number of images. For example, the list of geolocation candidates may be any amount from one candidate to the total global data. An amount threshold may be selected such as, for example, 300, 100, 10, or any other number. In some embodiments, the threshold for candidate list amount may be based on the probability for each image. In some such embodiments, only candidates with a minimum rank are presented to the user.

At step 336, the system determines which, if any, images qualify for retraining the CNNs. A minimum ranking threshold may be established. When an image is ranked above the threshold, the image may be stored for training the CNNs of the geolocation system. At steps 338-340, in some embodiments, the system continuously or periodically retrains when new training data becomes available. As described above, as image data is collected and processed, that data may be used to retrain the CNNs. The system may be implemented as a continuous learning system. The system may be automatically updated and, in some embodiments, manually updated with manual annotations and known image uploads for training purposes. When images are correctly identified, or identify features above a specified probability threshold, the system parameters may be updated or replaced. A true test positive rate may be used to determine the probability that the CNNs test true and a positive predictive value may be applied such that the confidence in the various CNNs may be known. If the confidence in the CNNs increases based on the results of LC matcher, the new parameters for the corresponding CNN may be stored. If the confidence does not change or is decreased, then the new parameters are not stored. In some embodiments, the threshold may also be updated. As the system increases accuracy, the threshold may increase to only allow updates that improve the system. This process for increasing the confidence in the CNNs may be applied to any CNNs or algorithms described herein.

In some embodiments, each CNN is modular and processes data independently. The images may be processed through the CNNs in any order. The order may be modified to optimize the reduction of images such that the first CNN reduces the number of images the most. In this way, the system may be optimized for efficient processing. In some embodiments, the system may further provide efficient processing by utilizing cloud-based support. For example, Kubernetes clusters may be utilized for high-priority and efficient processing of large volumes of images and image data. Selective processing may be used to maximize efficiency within a fixed budget by clustering. In some embodiments, only the highest priority images are processed based on the output of each cluster.

In some embodiments, the file structure may be required to store a large number of files, store files with the same name, store all files associated with a query in a single folder, and support easy lookup of query files by all processes described above. To meet these extensive requirements the files may be named according to time of processing. For example, the structure may be arranged such that a file is stored under a root, by year, by month, by day, bay hour, and with a unique identification number. Further, the files may be stored as a key value pair in the database.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed, and substitutions made herein without departing from the scope of the invention as recited in the claims.

Having thus described various embodiments of the invention, what is claimed as new and desired to be protected by Letters Patent includes the following:

1. A method of determining a geographic location from an image indicative of a location that the image was taken, comprising the steps of:
   obtaining a plurality of images,
   wherein locations where the plurality of images were taken are unknown;

determining a first probability for each image of the plurality of images that each image of the plurality of images is of an outdoor environment;

determining a second probability for each image of the plurality of images that each image contains content of interest;

determining a third probability for each image of the plurality of images that each image depicts each location indicative of where each image was taken that can be automatically determined;

combining the first probability, the second probability, and the third probability for each image to determine a set of images each with a combined probability above a threshold;

determining a skyline in each image of a first remaining set of images, wherein the first remaining set of images is a subset of the set of images;

determining a depth of the skyline in each image of a second remaining set of images, wherein the second remaining set of images is a subset of the first remaining set of images;

determining an image region of interest for each image of a third remaining set of images, wherein the third remaining set of images is a subset of the second remaining set of images; and determining a geolocation for each image of the third remaining set of images, wherein the geolocation for each image is indicative of each location that each image was taken.

2. The method of claim 1, wherein the plurality of images are obtained from the Internet.

3. The method of claim 1, wherein the first probability is determined by a places convolutional neural network, wherein the second probability is determined by an interest convolutional neural network, and wherein the third probability is determined by a locatable convolutional neural network.

4. The method of claim 1, further comprising the steps of:

determining a mountain probability of a region of mountains, a sky probability of a region of sky, and an others probability of a region of other in each image of the set of images;

segmenting each image in the set of images into a probability mountain segment, a probability sky segment, and a probability other segment to generate a probability map;

determining a probable skyline between the probability mountain segment, and the probability sky segment in each image of the set of images; and tracking the probable skyline to determine coordinates of a rough skyline in each image of the set of images.

5. The method of claim 4, further comprising the step of determining coordinates of a fine skyline in each image of the set of images by performing an iterative processes of image refinement starting with the set of images comprising the coordinates of the rough skyline, the process comprising:

determining a fine mountain probability of the region of mountains, a fine sky probability of the region of sky, and a fine others probability of the region of other in each image of the set of images with the rough skyline;

segmenting each image in the set of images with the rough skyline into a fine probability mountain segment, a fine probability sky segment, and a fine probability other segment to generate a fine probability map;

determining a fine probable skyline between the fine probability mountain segment, and the fine probability sky segment in each image of the set of images with the rough skyline; and tracking the fine probable skyline to determine the coordinates of the fine skyline in each image of the set of images with the rough skyline, wherein the fine skyline comprises a string of individual pixels.

6. The method of claim 1, further comprising the steps of:

determining a ridgeline depth of each of one or more ridgelines in the set of images;

determining a mean depth and a standard deviation of the ridgeline depth of each of the one or more ridgelines; and grouping the one or more ridgelines based on the mean depth and the standard deviation.

7. The method of claim 1, further comprising the step of ordering the set of images from a highest combined probability to a lowest combined probability, wherein the lowest combined probability is above the threshold.

8. The method of claim 1, wherein the threshold is a first threshold, and further comprising the steps of:

determining a subset of images from the set of images by comparing the combined probability to a second threshold, wherein the subset of images comprises images with combined probabilities above the second threshold; and retraining at least one of a places convolutional neural network, an interest convolutional neural network, a locatable convolutional neural network, a skyline convolutional neural network, a region of interest convolutional neural network, and a depth convolutional neural network, with the subset of images.

9. One or more non-transitory computer-readable media storing computer-executable instructions that, when executed by at least one processor, perform the steps of determining a geographic location from an image indicative of a location that the image was taken, comprising the steps of:

obtaining a plurality of images from the Internet, wherein locations where the plurality of images were taken are unknown;

determining a first probability for each image of the plurality of images that each image of the plurality of images is of an outdoor environment;

determining a second probability for each image of the plurality of images that each image contains content of interest;

determining a third probability for each image of the plurality of images that each image depicts each location indicative of where each image was taken that can be automatically determined;

combining the first probability, the second probability, and the third probability for each image to determine a set of images each with a combined probability above a threshold;

determining a probability map in each image of the set of images, wherein the probability map presents a probable mountain area, a probable sky area, and a probable others area;

determining a rough skyline between the probable mountain area and the probable sky area;

determining a fine skyline in each image of a first remaining set of images, wherein the first remaining set of images is a subset of the set of images;

determining a depth of the fine skyline in each image of a second remaining set of images,
wherein the second remaining set of images is a subset of the first remaining set of images;
determining an image region of interest for each image of a third remaining set of images;
wherein the third remaining set of images is a subset of the second remaining set of images; and
determining a geolocation for each image of the third remaining set of images,
wherein the geolocation for each image is indicative of each location that each image was taken.

10. The media of claim 9, wherein the computer-readable media stores further instructions to perform the steps of:
segmenting each image in the set of images into a probability mountain segment, a probability sky segment, and a probability other segment;
determining a probable skyline between the probability mountain segment, and the probability sky segment in each image of the set of images; and
tracking the probable skyline to determine coordinates of the rough skyline in each image of the set of images.

11. The media of claim 10, wherein the computer-readable media stores further instructions to perform the step of determining coordinates of the fine skyline in each image of the set of images by performing an iterative processes of image refinement starting with the set of images comprising the coordinates of the rough skyline, the process comprising:
determining a fine mountain probability of a region of mountains, a fine sky probability of a region of sky, and a fine others probability of a region of other in each image of the set of images with the rough skyline;
segmenting each image in the set of images with the rough skyline into a fine probability mountain segment, a fine probability sky segment, and a fine probability other segment to generate a fine probability map;
determining a fine probable skyline between the fine probability mountain segment, and the fine probability sky segment in each image of the set of images with the rough skyline; and
tracking the fine probable skyline to determine the coordinates of the fine skyline in each image of the set of images with the rough skyline,
wherein the fine skyline comprises a string of individual pixels.

12. The media of claim 9, wherein the computer-readable media stores further instructions to perform the steps of:
determining a ridgeline depth of each of one or more ridgelines in the set of images;
determining a mean depth and a standard deviation of the ridgeline depth of each of the one or more ridgelines; and
grouping the one or more ridgelines based on the mean depth and the standard deviation.

13. The media of claim 9, wherein the computer-readable media stores further instructions to perform the step of ordering the set of images from a highest combined probability to a lowest combined probability, wherein the lowest combined probability is above the threshold.

14. The media of claim 9, wherein the threshold is a first threshold, and wherein the computer-readable media stores further instructions to perform the steps of:
determining a subset of images from the set of images by comparing the combined probability to a second threshold,
wherein the subset of images comprises images with combined probabilities above the second threshold; and
retraining at least one of a places convolutional neural network, an interest convolutional neural network, a locatable convolutional neural network, a skyline convolutional neural network, a region of interest convolutional neural network, and a depth convolutional neural network, with the subset of images.

15. A method of determining a geographic location from an image indicative of a location that the image was taken, the method comprising the steps of:
obtaining a plurality of images from an online source,
wherein locations where the plurality of images were taken are unknown;
determining a first probability for each image of the plurality of images that each image of the plurality of images is of an outdoor environment;
determining a second probability for each image of the plurality of images that each image contains content of interest;
determining a third probability for each image of the plurality of images that each image depicts each location indicative of where each image was taken that can be automatically determined;
combining the first probability, the second probability, and the third probability for each image to determine a set of images each with a combined probability above a threshold;
determining a skyline in each image of a first remaining set of images,
wherein the first remaining set of images is a subset of the set of images;
determining a depth of the skyline in each image of a second remaining set of images,
wherein the second remaining set of images is a subset of the first remaining set of images;
determining a region of interest for each image of a third remaining set of images,
wherein the third remaining set of images is a subset of the second remaining set of images; and
determining a geolocation for each image of the third remaining set of images,
wherein the geolocation for each image is indicative of each location that each image was taken.

16. The method of claim 15, wherein the first probability, the second probability, and the third probability are multiplied to determine the combined probability.

17. The method of claim 15, further comprising the steps of:
determining a ridgeline depth of each of one or more ridgelines in the set of images;
determining a mean depth and a standard deviation of the ridgeline depth of each of the one or more ridgelines; and
grouping the one or more ridgelines based on the mean depth and the standard deviation.

18. The method of claim 15, further comprising the step of ordering the set of images from a highest combined probability to a lowest combined probability, wherein the lowest combined probability is above the threshold.

19. The method of claim 15, wherein the threshold is a first threshold, and further comprising the steps of:
determining a subset of images from the set of images by comparing the combined probability to a second threshold,
wherein the subset of images comprises images with combined probabilities above the second threshold; and
retraining at least one of a places convolutional neural network, an interest convolutional neural network, a locatable convolutional neural network, a skyline convolutional neural network, a region of interest convolutional neural network, and a depth convolutional neural network, with the subset of images.

20. The method of claim 19, wherein the second threshold is a minimum positive predictive value for each image location that presents a confidence in a geolocation match.

* * * * *